US011932996B2

(12) United States Patent
Widlroither

(10) Patent No.: US 11,932,996 B2
(45) **Date of Patent: *Mar. 19, 2024**

(54) NAIL PUNCHING MACHINE FOR DRIVING IN OR PULLING OUT RAIL SPIKES OF A RAIL TRACK

(71) Applicant: ROBEL Bahnbaumaschinen GmbH, Freilassing (DE)

(72) Inventor: Otto Widlroither, Freilassing (DE)

(73) Assignee: ROBEL BAHNBAUMASCHINEN GMBH, Freilassing (DE)

(*) Notice: Subject to any disclaimer, the term of this patent is extended or adjusted under 35 U.S.C. 154(b) by 0 days.

This patent is subject to a terminal disclaimer.

(21) Appl. No.: 17/590,931

(22) Filed: Feb. 2, 2022

(65) Prior Publication Data

US 2022/0154412 A1 May 19, 2022

Related U.S. Application Data

(63) Continuation of application No. 16/519,798, filed on Jul. 23, 2019, now Pat. No. 11,274,400.

(30) Foreign Application Priority Data

Jul. 25, 2018 (DE) ..................... 10 2018 212 371.3

(51) Int. Cl.

| | |
|---|---|
| ***B25D 17/04*** | (2006.01) |
| ***B25D 11/06*** | (2006.01) |
| ***B25D 17/20*** | (2006.01) |
| ***E01B 29/26*** | (2006.01) |
| *B25D 17/24* | (2006.01) |

(52) U.S. Cl.

CPC .............. *E01B 29/26* (2013.01); *B25D 11/06* (2013.01); *B25D 17/043* (2013.01); *B25D 17/20* (2013.01); *B25D 17/24* (2013.01); *B25D 2217/0061* (2013.01); *B25D 2217/0073* (2013.01); *B25D 2250/171* (2013.01); *E01B 2201/04* (2013.01)

(58) Field of Classification Search

CPC ....... E01B 29/26; B25D 11/06; B25D 17/043; B25D 17/20; B25D 2217/0061; B25D 2217/0073; B25C 11/00; B25C 11/02; B25F 5/00; B25F 5/006

USPC ..... 227/63, 132, 156; 173/91, 104, 135, 211

See application file for complete search history.

(56) References Cited

U.S. PATENT DOCUMENTS

| | | | | |
|---|---|---|---|---|
| 8,474,547 B2 * | 7/2013 | Oothoudt | E21B 7/24 | 173/162.1 |
| 2012/0031639 A1 * | 2/2012 | Roberts | B25D 17/043 | 173/162.2 |
| 2013/0025897 A1 * | 1/2013 | Harcar | B25D 17/043 | 173/162.2 |
| 2015/0053449 A1 * | 2/2015 | Henke | E01B 29/26 | 173/128 |
| 2017/0350078 A1 * | 12/2017 | Benjamin | B25C 11/00 | |

(Continued)

FOREIGN PATENT DOCUMENTS

| | | | |
|---|---|---|---|
| CN | 2608542 Y * | 3/2004 | E01B 27/14 |
| CN | 2608542 Y * | 3/2004 | E01B 27/14 |

*Primary Examiner* — Jacob A Smith

(74) *Attorney, Agent, or Firm* — McGlew and Tuttle, P.C.

(57) ABSTRACT

A nail punching machine for driving in or pulling out rail spikes includes a driving mechanism, which is driven by an electric drive motor. The electric drive motor is supplied with electric power by an accumulator. The nail punching machine is held by an operator by at least one handle.

38 Claims, 4 Drawing Sheets

(56) References Cited

U.S. PATENT DOCUMENTS

2019/0195019 A1* 6/2019 Wang ...................... E21B 7/028
2020/0283964 A1* 9/2020 Melvelle ................. E01B 29/24

* cited by examiner

NAIL PUNCHING MACHINE FOR DRIVING IN OR PULLING OUT RAIL SPIKES OF A RAIL TRACK

CROSS REFERENCE TO RELATED APPLICATIONS

This application is a continuation under 37 CFR 1.53(b) of pending prior U.S. patent application Ser. No. 16/519,798 filed Jul. 23, 2019, which claims the benefit of priority under 35 U.S.C. § 119 of German Patent Application Serial No. DE 10 2018 212 371.3, filed Jul. 25, 2018, the entire contents of each application are incorporated herein by reference.

TECHNICAL FIELD

The invention relates to a nail punching machine for driving in or pulling out rail spikes of a rail track.

TECHNICAL BACKGROUND

From the prior art, a hydraulically driven nail punching machine is known. Such a nail punching machine serves for driving in and pulling out rail spikes, which connect rails with corresponding ties. Working with such a nail punching machine is highly exhausting and uncomfortable for an operator.

SUMMARY

An object of the invention is to create a nail punching machine which is constructed simply and is reliable, and allows for high user comfort.

This object is achieved by a nail punching machine for driving in or pulling out rail spikes of a rail track, comprising at least one handle for holding the nail punching machine, a driving mechanism for driving a rail spike, an electric drive motor for driving the driving mechanism, and an accumulator for supplying the electric drive motor with electric power.

The nail punching machine can be operated electrically by means of the electric drive motor and the accumulator, with the result that hydraulic lines, which might affect the user comfort, are not required. Due to the electric drive motor and the corresponding accumulator, the setup and the operation of the nail punching machine are thus simplified.

The nail punching machine comprises in particular at least one tool. The at least one tool is configured as a hammer or as pliers. The at least one tool, preferably, is exchangeable. The at least one tool is coupled with the driving mechanism, with the result that a rail spike can be driven into a corresponding tie and/or be pulled out of a tie.

The driving mechanism, preferably, is configured as an axial driving mechanism, which works in an exclusively linear manner, in an axial direction of the nail punching machine. The axial driving mechanism thus, preferably, does not carry out any displacement movement radially to the rotation axis and/or around the rotation axis of the drive motor, i.e. no rotary motion around the rotation axis. The driving mechanism comprises in particular an axial striking mechanism, which, by means of the electric drive motor, is displaceable in an exclusively linear manner in the direction of the rotation axis of the drive motor.

The electric drive motor and/or the driving mechanism, preferably, are arranged in a pipe. The driving mechanism, in particular, is arranged in a lower section of the pipe. The pipe is preferably connected with a vibration decoupling device. The electric drive motor, in particular, is arranged in the pipe, between the driving mechanism and the vibration decoupling device.

A nail punching machine comprising a vibration decoupling device for decoupling vibrations of the at least one handle and the driving mechanism ensures high user comfort in a simple manner. By means of the vibration decoupling device, the at least one handle is decoupled in a vibration-dampening manner from the driving mechanism. The vibration decoupling device, preferably, is configured in a way that an operator's hand-arm vibrations do not exceed a limit value of 5 m/s$^2$. The at least one handle serves for holding the nail punching machine with both hands. The vibration decoupling device defines a decoupling plane, which separates a working side from an operating side. The driving mechanism is arranged on the working side, whereas the at least one handle is arranged on the operating side, with the result that forces or vibrations produced by driving mechanism, due to the vibration decoupling device, only work in a strongly dampened manner on the at least one handle. The term decoupling plane is to be understood function-wise in a way that, by means of the vibration decoupling device, the working side's vibrations are decoupled from the operating side. The term decoupling plane by no means is to be understood as a strictly geometric plane.

A nail punching machine wherein the vibration decoupling device has at least one vibration damper for configuring a decoupling plane between the driving mechanism and the at least one handle ensures high user comfort. The at least one vibration damper is configured in an elastic manner, with the result that a decoupling of vibrations or dampening of vibrations is achieved. Preferably, the at least one vibration damper comprises an elastomer material, in particular a rubber material. The vibration decoupling device has in particular at least two, in particular at least three and in particular at least four vibration dampers. The vibration dampers, preferably, are arranged around a rotation axis of the electric drive motor. By means of the at least one vibration damper, the decoupling plane between the driving mechanism and the at least one handle is configured.

A nail punching machine wherein the driving mechanism and the electric drive motor are arranged on a working side of a decoupling plane configured by the vibration decoupling device ensures high user comfort in a simple manner. Due to the fact that the electric drive motor, together with the driving mechanism, is arranged on the working side of the decoupling plane, the forces or vibrations produced by the electric drive motor, as well, are decoupled or dampened by means of the vibration decoupling device, with the result that those also work only in a strongly dampened manner on the at least one handle. Due to the fact that the electric drive motor is arranged on the working side, the mechanical connection with the driving mechanism is configured in a simple and reliable manner. In particular, it is not necessary to guide a mechanical driving shaft through the decoupling plane and to decouple or dampen vibrations transmitted by the mechanical driving shaft, as well. Due to the fact that there is no mechanical connection leading through the decoupling plane in order to drive the driving mechanism, an operator's hand-arm vibrations can be reduced and the user comfort can be increased. Additionally, the at least one handle can vibrate in an undisturbed manner in its own frequency, which reduces the hand-arm vibrations. Due to the omission of a mechanical connection through the decoupling plane, the nail punching machine is configured in a simple and reliable manner, since components that are prone to failure are dispensed with.

A nail punching machine wherein the at least one handle and the accumulator are arranged on an operating side of a decoupling plane configured by the vibration decoupling device ensures high user comfort in a simple manner. Due to the fact that the accumulator is arranged on the operating side, it constitutes a counter-mass to the driving mechanism and as necessary to the electric drive motor, with the result that the accumulator causes an effective vibration dampening or vibration decoupling on the at least one handle. Preferably, the accumulator is mounted to a supporting frame, to which in turn at least one handle and the vibration decoupling device are mounted.

A nail punching machine wherein the accumulator is exchangeably mounted to a supporting frame and connected with a handle ensures high user comfort in a simple manner. Due to the fact that the accumulator is exchangeably mounted to the supporting frame, a discharged accumulator can be replaced quickly and simply by a charged accumulator during the operation of the nail punching machine, and the operation of the nail punching machine can be continued. The handle connected with the accumulator on the one hand serves for exchanging the accumulator and on the other hand serves for holding the nail punching machine during its operation. Due to the fact that the accumulator and the handle mounted therein are arranged on the operating side, the handle mounted to the accumulator is also decoupled from vibrations or vibration-dampened.

A nail punching machine wherein a control device is arranged on an operating side of a decoupling plane configured by the vibration decoupling device ensures high reliability and high user comfort. Due to the fact that the control device is arranged on the operating side, it is protected from undampened forces or vibrations of the driving mechanism and of the drive motor, which causes high reliability of the nail punching machine. The control device comprises in particular at least one operating agent for actuating the electric drive motor, which is mounted in a simple manner to the vibration-decoupled or vibration-dampened operating side near the at least one handle or to the at least one handle.

A nail punching machine wherein, exclusively, lines are running through a decoupling plane configured by the vibration decoupling device ensures high user comfort in a simple manner. Due to the fact that, exclusively, lines are running through the decoupling plane, i.e. no mechanical connection for driving the driving mechanism is running through the decoupling plane, an optimal vibration decoupling or vibration dampening is achieved. The lines, in particular, are configured in a flexible manner. The lines are electric lines for actuation and energy supply of the electric drive motor and, as necessary, electric lines of a cooling device and, as necessary, at least one coolant line. Due to the fact that the accumulator, preferably, is arranged on the operating side and the electric drive motor, together with the driving mechanism, are arranged on the working side, it is sufficient that, exclusively, electric lines for actuation and energy supply and, as necessary, at least one coolant line are running through the decoupling plane. The lines essentially do not transmit any forces or vibrations from the working side to the operating side.

A nail punching machine comprising a cooling device for cooling the electric drive motor and/or the driving mechanism ensures high reliability. By means of the cooling device, the heat produced during the operation of the nail punching machine by the electric drive motor and/or the driving mechanism can be dissipated easily, with the result that the electric drive motor and/or the driving mechanism are cooled sufficiently. The cooling device, in particular, is arranged on the operating side and/or on the working side of a decoupling plane defined by the vibration decoupling device, with the result that for operating the cooling device, exclusively at least one electric line and/or at least one coolant line are running through the decoupling plane. The cooling device, for example, is a fan which can be driven electrically and uses air as cooling medium. Further on, the cooling device, for example, comprises a pump and a cooler for conveying and cooling a liquid as cooling medium.

A nail punching machine wherein the electric drive motor is arranged in an upper section of a pipe, turned away from the rail track ensures high reliability and high user comfort in a simple manner. The pipe, which in particular is arranged between a vibration decoupling device and a free end of the nail punching machine, has a length L. The pipe can be configured in one part or in several parts. The pipe has an upper section and a lower section. The upper section has a length $L_O$, provided that: $L_O \leq 0.5$ L, in particular $L_O \leq 0.4$ L, and in particular $L_O \leq 0.3$ L. Due to the fact that the electric drive motor is arranged in the upper section and outside the lower section, maintenance and, as necessary, cooling of the electric drive motor are easily possible.

A nail punching machine wherein the electric drive motor is arranged in a lower section of a pipe, facing the rail track ensures a simple setup and high user comfort. The pipe, which in particular is arranged between the vibration decoupling device and the free end of the nail punching machine, has a length L. The pipe can be configured in one part or in several parts. The pipe has an upper section and a lower section. The lower section has a length $L_U$, provided that: $L_U \leq 0.5$ L, in particular $L_U \leq 0.6$ L, and in particular $L_U \leq 0.7$ L. Due to the fact that the electric drive motor and the driving mechanism are arranged in the lower section, the mechanical setup is simple. An additional driving shaft between the driving mechanism and the electric drive motor is not required.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
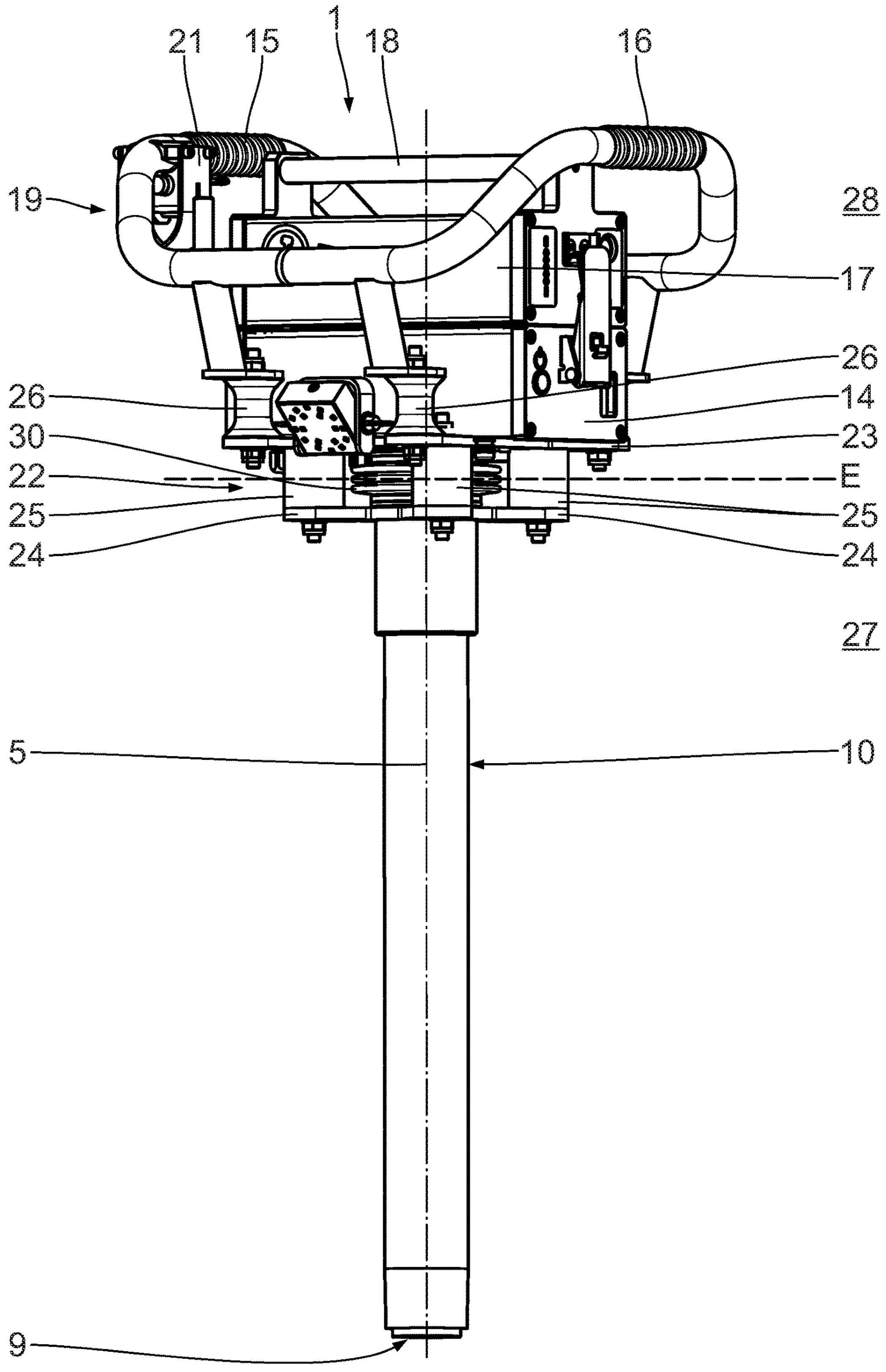
FIG. 1 is a perspective view of a nail punching machine according to a first embodiment.
Figure 2:
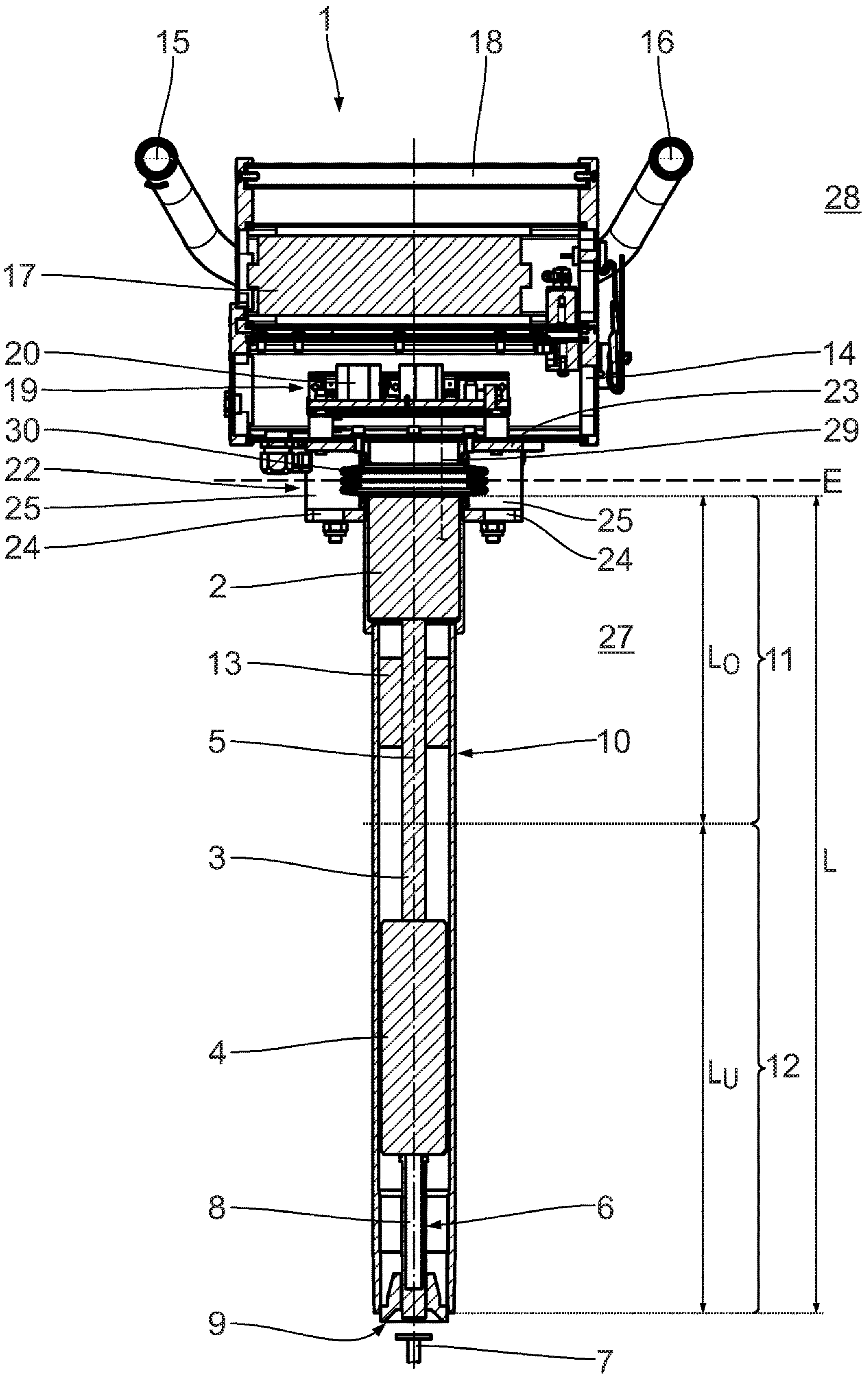
FIG. 2 is a sectional view of the nail punching machine in FIG. 1.

In the following, a first embodiment of the invention is described with reference to FIGS. 1 and 2. An electrically drivable nail punching machine 1 has an electric drive motor 2, which is connected via a driving shaft 3 with a driving mechanism 4. The driving mechanism 4 is configured in the usual manner as an axial driving mechanism, which is displaceable exclusively in a linear manner in the direction of a rotation axis 5 of the drive motor 2. The driving mechanism 4, for example, is configured as an axial striking mechanism. The driving mechanism 4 is known and common.

The driving mechanism 4 is exchangeably coupled with a tool 6. The tool 6 is configured as a hammer for driving in a rail spike 7. The tool 6 comprises a hammer shaft 8 and a hammer head 9. The tool 6 configured as a hammer is known and common. The nail punching machine 1 with the tool 6 configured as a hammer thus serves as a spike driver.

The electric drive motor 2, the driving shaft 3 and the driving mechanism 4 are arranged in a pipe 10. The pipe 10 has an axial length L and is divided into an upper section 11 and a lower section 12. The upper section 11 has an axial length $L_O$, whereas the lower section 12 has an axial length $L_U$. For the length $L_O$ preferably applies: $L_O \leq 0.5$ L, in particular $L_O \leq 0.4$ L, and in particular $L_O \leq 0.3$ L. On the other hand, for the length $L_U$ preferably applies: $L_U \leq 0.5$ L, in particular $L_U \leq 0.6$ L, and in particular $L_U \leq 0.7$ L.

The electric drive motor 2 is arranged on an end of the pipe 10, turned away from the tool 6, in the upper section 11 and outside the lower section 12. On the other hand, the driving mechanism 4 is arranged near the tool 6 in the lower section 12 and outside the upper section 11. The driving shaft 3 is arranged in the pipe 10 and couples the electric drive motor 2 with the driving mechanism 4. The driving shaft 3 thus runs in the upper section 11 and the lower section 12. The driving shaft 3 is mounted in the pipe 10 by means of a bearing 13.

The nail punching machine 1 further comprises a supporting frame 14, on which a first handle 15 and a second handle 16 are arranged laterally. An accumulator 17 is exchangeably mounted to the supporting frame 14. The accumulator 17 is connected with a third handle 18. The accumulator 17 supplies the electric drive motor 2 and a control device 19 with electric power. The control device 19 comprises a control 20 mounted to the supporting frame 14 and an operating unit 21 arranged on one of the handles 15, 16. The operating unit 21, for example, has at least one operating agent for actuating the electric drive motor 2.

For decoupling vibrations of the handles 15, 16, 18 from the driving mechanism 4 and the electric drive motor 2, the nail punching machine 1 has a vibration decoupling device 22. The vibration decoupling device 22, on the operating side, comprises a mounting element 23, which is mounted to the supporting frame 14, and, on the working side, mounting elements 24 which are mounted to the pipe 10. The vibration decoupling device 22 further on comprises a number of first vibration dampers 25 which connect the mounting element 23 on the operating side with the mounting elements 24 on the working side. As an example, the nail punching machine 1 has four vibration dampers 25, which are arranged around the rotation axis 5 of the electric drive motor 2. Moreover, the vibration decoupling device 22 comprises a number of second vibration dampers 26, which connect the handles 15, 16 with the mounting element 23 on the operating side and the supporting frame 14. The vibration dampers 25, 26 are made of an elastomer material, for example a rubber material.

The vibration decoupling device 22 or the vibration dampers 25 configure a decoupling plane E, which decouples or separates a working side 27 from an operating side 28. On the working side 27, the pipe 10, the electric drive motor 2, the driving shaft 3 and the driving mechanism 4 as well as the tool 6 are arranged. On the other hand, on the operating side 28, the supporting frame 14 with the handles 15, 16 as well as the accumulator 17 with the handle 18 and the control device 19 are arranged.

Through the decoupling plane E, exclusively, electric lines 29 for actuation and energy supply of the electric drive motor 2 are running from the operating side 28 to the working side 27. The electric lines 29 are only depicted schematically in FIG. 2. The electric lines 29 are protected by a rubber bellow 30.

The nail punching machine 1 serves for driving in rail spikes 7. The rail spikes 7 serve for connecting rails and ties of a rail track. By means of the control device 19, the electric drive motor 2 is actuated by an operator in a way that the hammer head 9 is displaced downwards and upwards in a linear manner from the driving mechanism 4 along the rotation axis 5, with the result that the hammer head 9 drives in a rail spike 7 in the desired manner. During this process, the operator holds the nail punching machine 1 with both hands on the handles 15 and 16. Due to the vibration decoupling device 22, forces or vibrations produced by the electric drive motor 2 and the driving in by means of the driving mechanism 4 are effectively dampened, with the result that the operating side 28 is decoupled from vibrations of the working side 27. The accumulator 17 here works as a counter mass on the operating side 28 and causes an effective vibration dampening.

When the accumulator 17 is discharged, it can be easily exchanged by means of the handle 18 and be replaced by a charged accumulator 17. Due to the fact that the control device 19 is arranged on the operating side 28, it is protected from vibrations.

Figure 3:
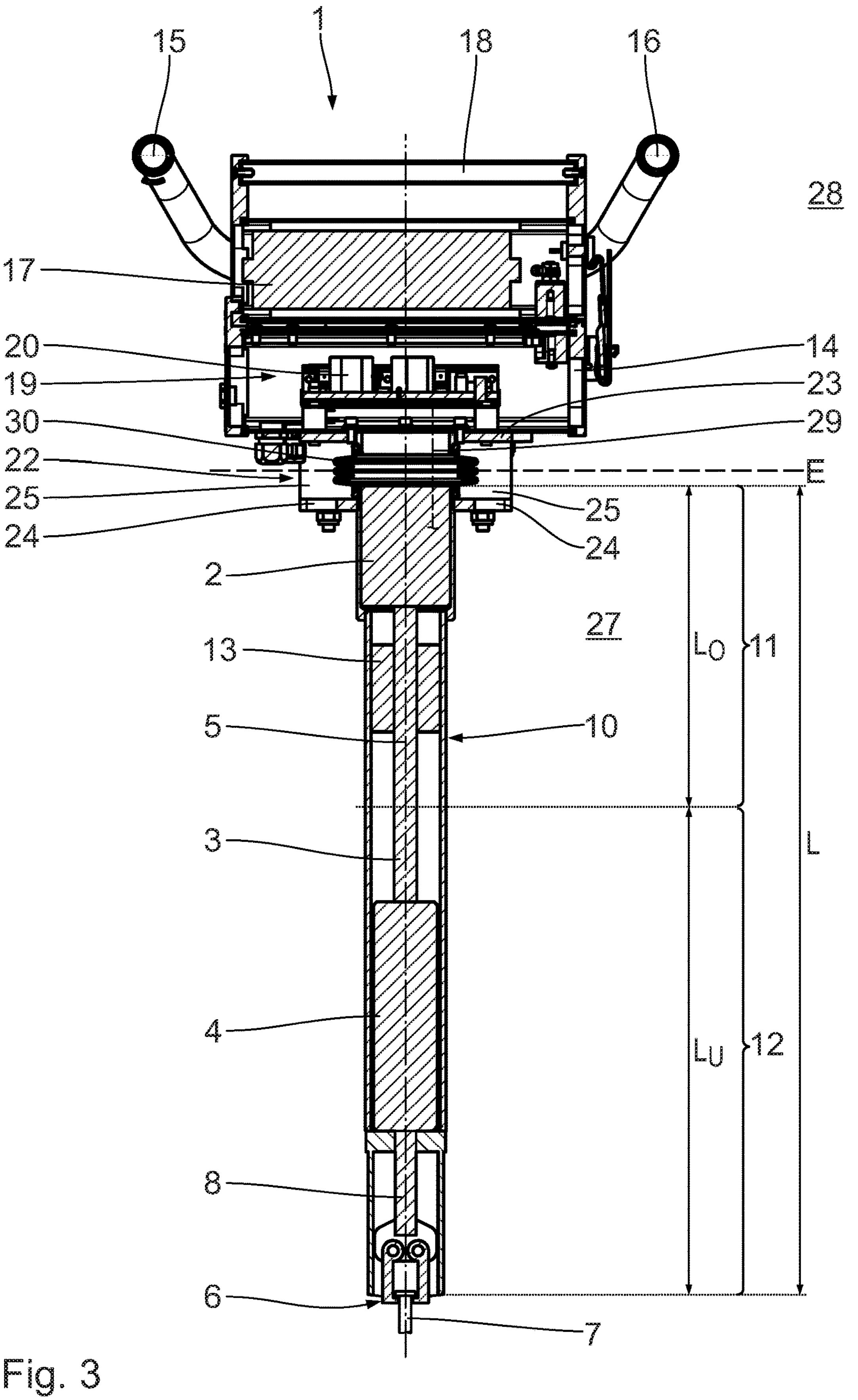
FIG. 3 is a sectional view of a nail punching machine according to a second embodiment.

In the following, a second embodiment of the invention is described with reference to FIG. 3. In contrast to the preceding embodiment, the tool 6 is configured as pliers for pulling out rail spikes 7. The nail punching machine 1, due to the configuration of the tool 6, thus serves as a spike puller. The tool 6 is exchangeably connected with the driving mechanism 4, with the result that the nail punching machine 1, via a tool change and the use of a tool 6 configured as a hammer, can also be used as a spike driver. For pulling out a rail spike 7, the pliers are drawn in the direction of the decoupling plane E by means of the driving mechanism 4 and the electric drive motor 2, with the result that the rail spike 7 to be pulled is pulled out of the tie and into the pipe 10. The operator, during this process, supports the nail punching machine 1 on the tie with the free end of the pipe 10. With regard to the further setup and the further functions, reference is made to the preceding embodiment.

Figure 4:
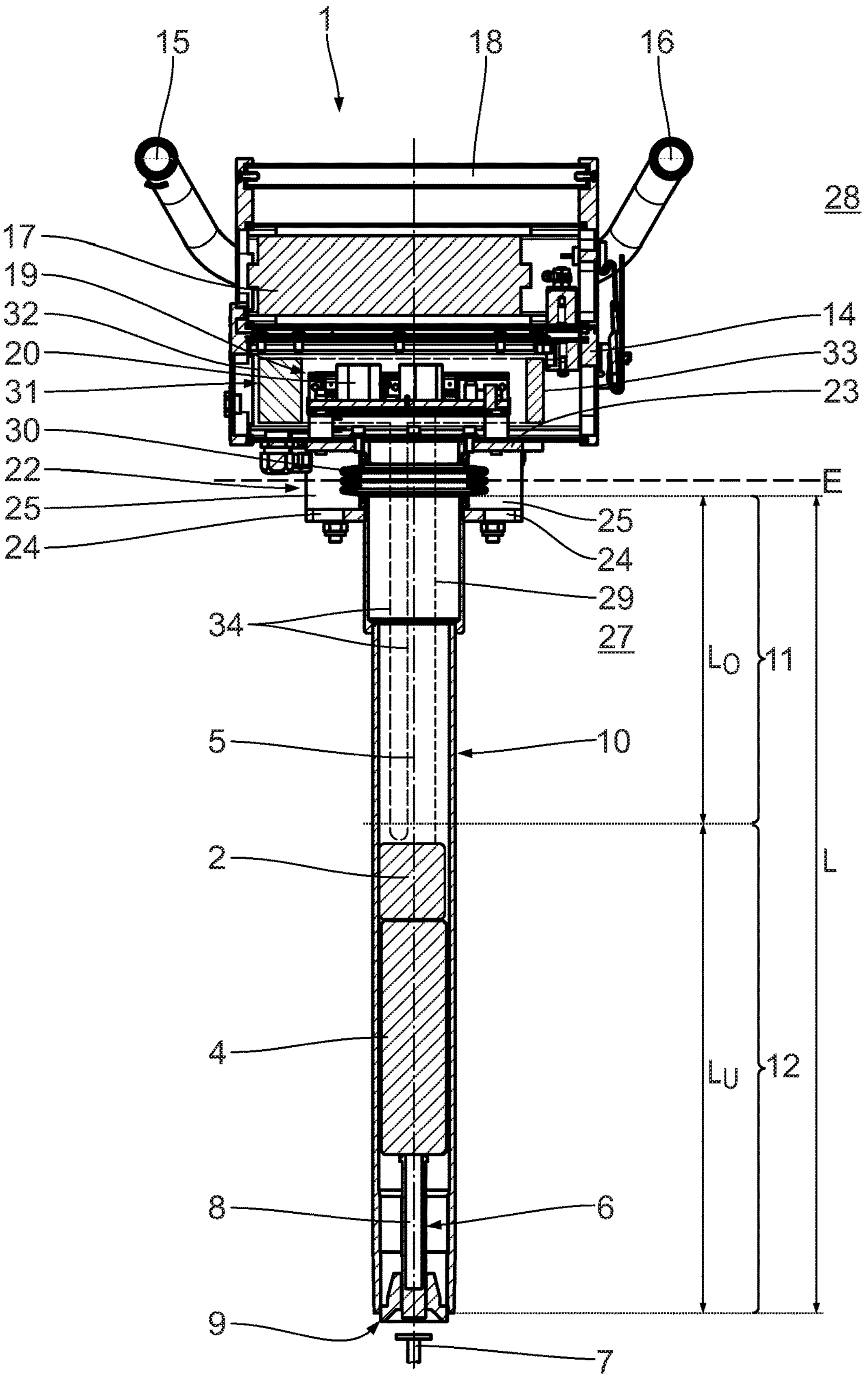
FIG. 4 is a sectional view of a nail punching machine according to a third embodiment.

In the following, a third embodiment of the invention is described with reference to FIG. 4. In contrast to the preceding embodiments, the electric drive motor 2 is arranged in the lower section 12, i.e. outside the upper section 11 of the pipe 10. The electric drive motor 2 is directly connected with the driving mechanism 4, with the result that no additional driving shaft and no corresponding bearing are required. The nail punching machine 1 further on comprises a cooling device 31 with a cooler 32, a pump 33 and a coolant line 34. The cooler 32 and the pump 33 are arranged on the supporting frame 14 on the operating side 28. The coolant line 34 leads from the cooler 32 and the pump 33 through the decoupling plane E into the pipe 10 and to the drive motor 2 and the driving mechanism 4. By means of the pump 33, a coolant is pumped through the coolant line 34, with the result that heat produced by the drive motor 2 and the driving mechanism 4 is dissipated from the pipe 10 and conveyed to the cooler 32. By means of the cooler 32, the heat supplied to the coolant is again dissipated to the surroundings. With regard to the further setup and the further functions of the nail punching machine 1, reference is made to the preceding embodiments.

While specific embodiments of the invention have been shown and described in detail to illustrate the application of the principles of the invention, it will be understood that the invention may be embodied otherwise without departing from such principles.

What is claimed is:

1. A nail punching machine for driving in rail spikes of a rail track, the nail punching machine comprising:

at least one handle for holding the nail punching machine;

an axial driving mechanism configured to work in an exclusively linear manner in an axial direction of the nail punching machine, the axial driving mechanism comprising a striking mechanism for driving a rail spike into a tie;

a tool configured as a hammer for driving in the rail spike;

an electric drive motor for driving the axial driving mechanism, wherein a rotation of the electric drive motor causes a linear movement of the striking mechanism along the axial direction and the striking mechanism is configured to strike the tool, wherein the tool is configured to be displaced downwards and upwards in a linear manner to drive in the rail spike; and an accumulator for supplying the electric drive motor with electric power.

2. The nail punching machine according to claim 1, further comprising a vibration decoupling device for decoupling vibrations of the at least one handle and the axial driving mechanism.

3. The nail punching machine according to claim 2, wherein the vibration decoupling device has at least one vibration damper for configuring a decoupling plane between the axial driving mechanism and the at least one handle.

4. The nail punching machine according to claim 2, wherein the axial driving mechanism and the electric drive motor are arranged on a working side of a decoupling plane configured by the vibration decoupling device.

5. The nail punching machine according to claim 2, wherein the at least one handle and the accumulator are arranged on an operating side of a decoupling plane configured by the vibration decoupling device.

6. The nail punching machine according to claim 5, wherein the accumulator is exchangeably mounted to a supporting frame and connected with a handle.

7. The nail punching machine according to claim 2, wherein a control device is arranged on an operating side of a decoupling plane configured by the vibration decoupling device.

8. The nail punching machine according to claim 2, wherein, exclusively, lines are running through a decoupling plane configured by the vibration decoupling device.

9. The nail punching machine according to claim 1, further comprising a cooling device for cooling at least one of the electric drive motor and the axial driving mechanism.

10. The nail punching machine according to claim 1, wherein the electric drive motor is arranged in an upper section of a pipe, turned away from the rail track.

11. The nail punching machine according to claim 1, wherein the electric drive motor is arranged in a lower section of a pipe, facing the rail track.

12. The nail punching machine according to claim 1, wherein the tool comprises a hammer shaft and a hammer head.

13. The nail punching machine according to claim 1, wherein the axial driving mechanism is coupled with the tool.

14. The nail punching machine according to claim 1, wherein the striking mechanism is an axial striking mechanism, which is displaceable in an exclusively linear manner in the direction of a rotation axis of the drive motor.

15. The nail punching machine according to claim 1, wherein the striking mechanism is configured to strike the tool in a linear manner along a rotation axis of the electric drive motor to displace the tool.

16. The nail punching machine according to claim 1, wherein the striking mechanism and the tool move in the same direction when the striking mechanism strikes the tool.

17. The nail punching machine according to claim 1, further comprising a supporting frame, on which the at least one handle is arranged.

18. The nail punching machine according to claim 17, further comprising a control device, wherein the accumulator supplies the control device with electric power, wherein the control device comprises a control mounted to the supporting frame and an operating unit is arranged at the at least one handle.

19. The nail punching machine according to claim 17, wherein the accumulator is mounted to the supporting frame and works as a counter mass for vibration damping.

20. The nail punching machine according to claim 1, wherein a longitudinal axis of the electric drive motor and a longitudinal axis of the axial driving mechanism are parallel to the axial direction.

21. A nail punching machine for driving in rail spikes of a rail track, the nail punching machine comprising:

a nail punching machine structure comprising:

a handle structure comprising a user engagement surface configured for a user to hold the nail punching machine structure;

an axial driving mechanism configured to work in an exclusively linear manner in an axial direction of the nail punching machine, the axial driving mechanism comprising a striking mechanism configured to drive a rail spike into a tie;

a tool configured as a hammer for driving in the rail spike;

an electric drive motor configured to drive the axial driving mechanism, wherein a rotation of the electric drive motor causes a linear movement of the striking mechanism along the axial direction and the striking mechanism is configured to strike the tool, wherein the tool is configured to be displaced downwards and upwards in a linear manner to drive in the rail spike; and an accumulator configured to deliver electric power to the electric drive motor.

22. The nail punching machine according to claim 21, wherein the nail punching machine structure further comprises a vibration decoupling device for decoupling vibrations of the handle structure and the axial driving mechanism.

23. The nail punching machine according to claim 22, wherein the vibration decoupling device has at least one vibration damper for configuring a decoupling plane between the axial driving mechanism and the handle structure.

24. The nail punching machine according to claim 22, wherein the axial driving mechanism and the electric drive motor are arranged on a working side of a decoupling plane defined by the vibration decoupling device.

25. The nail punching machine according to claim 22, wherein the handle structure and the accumulator are arranged on an operating side of a decoupling plane defined by the vibration decoupling device.

26. The nail punching machine according to claim 25, wherein the accumulator is exchangeably mounted to a supporting frame and connected with another handle structure.

27. The nail punching machine according to claim 22, wherein a control device is arranged on an operating side of a decoupling plane defined by the vibration decoupling device.

28. The nail punching machine according to claim 22, wherein, exclusively, lines are running through a decoupling plane defined by the vibration decoupling device.

29. The nail punching machine according to claim 21, wherein the nail punching machine structure further comprises a cooling device for cooling at least one of the electric drive motor and the axial driving mechanism.

30. The nail punching machine according to claim 21, wherein the tool comprises a hammer shaft and a hammer head.

31. The nail punching machine according to claim 21, wherein the driving mechanism is coupled with the tool.

32. The nail punching machine according to claim 21, wherein the striking mechanism is an axial striking mechanism, which is displaceable in an exclusively linear manner in the direction of a rotation axis of the drive motor.

33. The nail punching machine according to claim 21, wherein the striking mechanism is configured to strike the tool in a linear manner along a rotation axis of the electric drive motor to displace the tool.

34. The nail punching machine according to claim 21, wherein the striking mechanism and the tool move in the same direction when the striking mechanism strikes the tool.

35. The nail punching machine according to claim 21, further comprising a supporting frame, on which the handle structure is arranged.

36. The nail punching machine according to claim 35, further comprising a control device, wherein the accumulator supplies the control device with electric power, wherein the control device comprises a control mounted to the supporting frame and an operating unit is arranged at the handle structure.

37. The nail punching machine according to claim 35, wherein the accumulator is mounted to the supporting frame and works as a counter mass for vibration damping.

38. The nail punching machine according to claim 21, wherein a longitudinal axis of the electric drive motor and a longitudinal axis of the axial driving mechanism are parallel to the axial direction.

* * * * *